United States Patent
Twiddy et al.

(10) Patent No.: US 11,534,959 B2
(45) Date of Patent: Dec. 27, 2022

(54) DELAYED CURE ADDITIVE MANUFACTURING

(71) Applicant: Inkbit, LLC, Medford, MA (US)

(72) Inventors: Scott Twiddy, Somerville, MA (US); Richard Woudenberg, Burlington, MA (US)

(73) Assignee: Inkbit, LLC, Medford, MA (US)

( * ) Notice: Subject to any disclaimer, the term of this patent is extended or adjusted under 35 U.S.C. 154(b) by 0 days.

(21) Appl. No.: 17/031,212

(22) Filed: Sep. 24, 2020

(65) Prior Publication Data

US 2022/0088850 A1 Mar. 24, 2022

(51) Int. Cl.
*B29C 64/124* (2017.01)
*B29C 64/40* (2017.01)
*B33Y 10/00* (2015.01)
*B33Y 40/20* (2020.01)

(52) U.S. Cl.
CPC ............ *B29C 64/124* (2017.08); *B29C 64/40* (2017.08); *B33Y 10/00* (2014.12)

(58) Field of Classification Search
CPC ..... B29C 64/124; B29C 64/40; B29C 64/112; B29C 64/10; B33Y 10/00
See application file for complete search history.

(56) References Cited

U.S. PATENT DOCUMENTS

| | | | | |
|---|---|---|---|---|
| 8,574,485 B2 * | 11/2013 | Kramer | ................. | B29C 64/112 264/401 |
| 8,932,511 B2 * | 1/2015 | Napadensky | .......... | B33Y 40/00 264/401 |
| 10,252,466 B2 | 4/2019 | Ramos et al. | | |
| 10,350,833 B1 * | 7/2019 | Zaneveld | .............. | B29C 64/386 |
| 10,456,984 B2 | 10/2019 | Matusik et al. | | |
| 2003/0083771 A1 * | 5/2003 | Schmidt | ................. | B33Y 10/00 700/119 |
| 2003/0207959 A1 * | 11/2003 | Napadensky | .......... | B41M 3/006 522/183 |
| 2003/0209836 A1 * | 11/2003 | Sherwood | ............. | G03F 7/0037 264/401 |

(Continued)

FOREIGN PATENT DOCUMENTS

EP  1434683 A1  7/2004

OTHER PUBLICATIONS

Hybrid Manufacturing Technologies (retreived Sep. 23, 2020 from https://3dprintingindustry.com/news/hybrid-manufacturing-technologies-to-3d-print-parts-with-injection-molding-quality-171991/).

(Continued)

*Primary Examiner* — Seyed Masoud Malekzadeh
*Assistant Examiner* — Baileigh Kate Darnell
(74) *Attorney, Agent, or Firm* — Occhiuti & Rohlicek LLP

(57) ABSTRACT

A method for manufacturing a part includes fabricating an object in an additive fabrication stage, the object including a solid mold forming a cavity in the shape of a part with uncured or incompletely cured build material disposed therein. The build material in the cavity is cured in a curing stage that occurs at least partially after the additive fabrication stage. The build material undergoes a phase change mechanism occurring during the additive fabrication stage and a distinct polymerization mechanism occurring during the curing stage and at least partly after the additive fabrication stage of the object and cures the build material by a polymerization process.

23 Claims, 14 Drawing Sheets

(56) References Cited

U.S. PATENT DOCUMENTS

| | | | |
|---|---|---|---|
| 2005/0023719 A1* | 2/2005 | Nielsen | B29C 64/40 |
| | | | 264/162 |
| 2005/0093208 A1* | 5/2005 | Boyd | B29C 64/40 |
| | | | 264/442 |
| 2010/0288194 A1* | 11/2010 | Stockwell | B29C 64/112 |
| | | | 118/313 |
| 2014/0027950 A1* | 1/2014 | Stockwell | B32B 38/10 |
| | | | 264/344 |
| 2016/0001461 A1* | 1/2016 | Gardiner | E04G 11/00 |
| | | | 264/219 |
| 2016/0046079 A1 | 2/2016 | Belelie et al. | |
| 2016/0107383 A1* | 4/2016 | Dikovsky | B29C 64/106 |
| | | | 264/401 |
| 2017/0120535 A1 | 5/2017 | MacCurdy et al. | |
| 2017/0326795 A1* | 11/2017 | Facci | B29C 35/0805 |
| 2018/0036972 A1* | 2/2018 | Talgorm | B33Y 10/00 |
| 2019/0389139 A1* | 12/2019 | Wu | B29C 64/40 |
| 2020/0156298 A1 | 5/2020 | Jessen et al. | |
| 2021/0060869 A1* | 3/2021 | Kuester | B33Y 70/00 |

OTHER PUBLICATIONS

Reaction injection molding (retrieved on Sep. 23, 2020 from https://en.wikipedia.org/wiki/Reaction_injection_molding).
International Search Report, PCT Application No. PCT/US2021051932, dated Dec. 22, 2021 (7 pages).

* cited by examiner

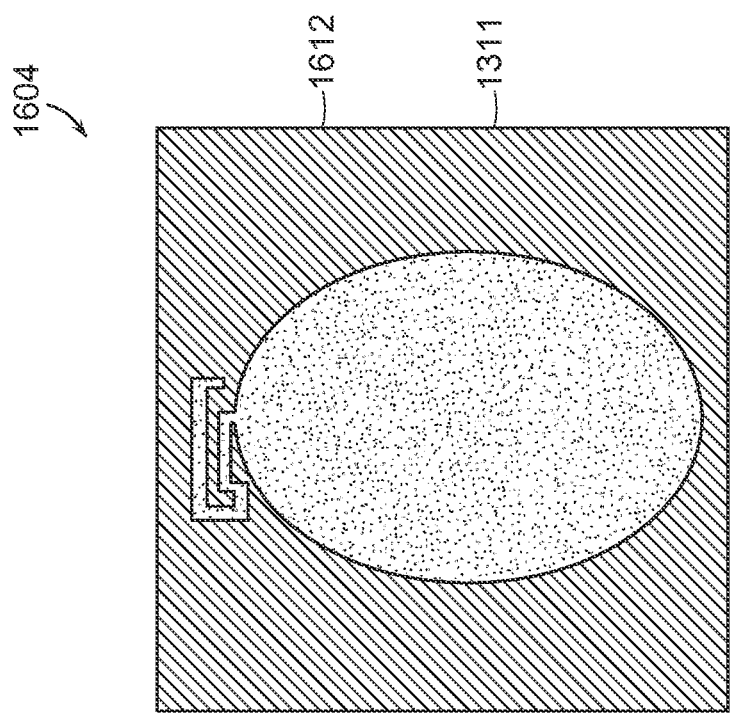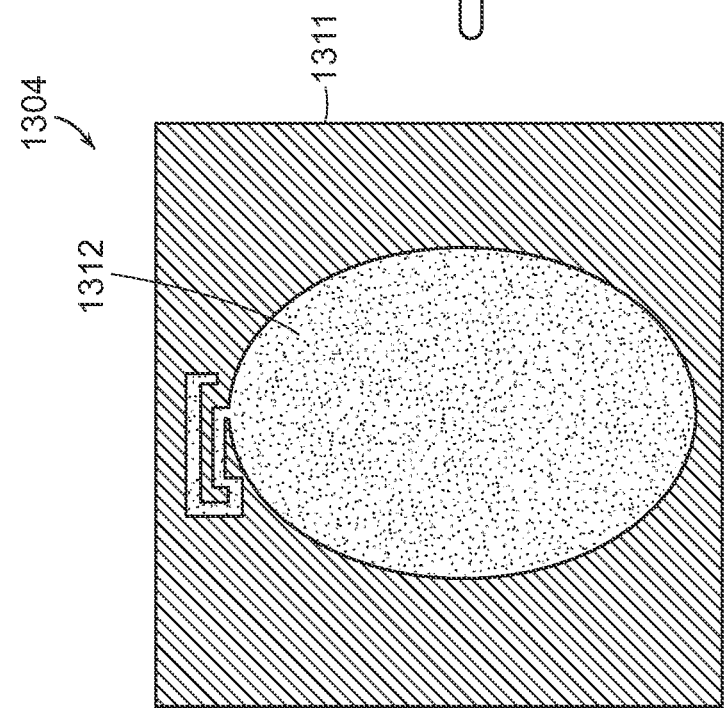
FIG. 16

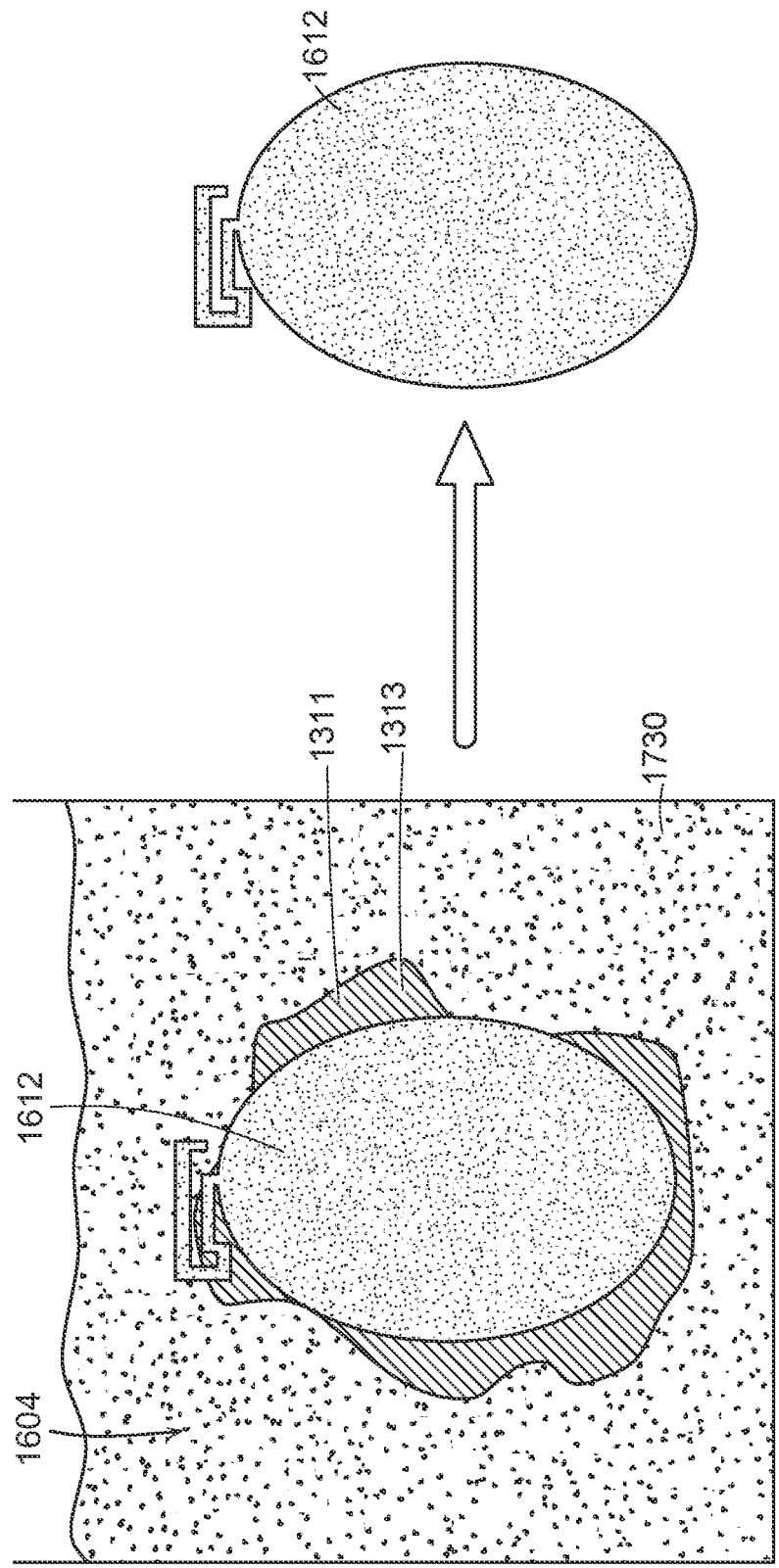

DELAYED CURE ADDITIVE MANUFACTURING

BACKGROUND OF THE INVENTION

This invention relates to a manufacturing process with a delayed curing step.

Some manufacturing techniques use molds to fabricate parts. A mold generally has a predefined shape and is filled with a build material (e.g., a molten material such as a molten metal or plastic). The build material solidifies, yielding the part. The part can then be removed, for example, by destroying or otherwise removing the mold.

Molds are often fabricated from metallic material (e.g., steel or aluminum) and are precision-machined to form the features of a desired part. When designing parts for molding, care must be taken to ensure that the parts are compatible with the molding process. For example, the material used for the part, the desired shape and features of the part, the material of the mold, and the properties of the molding machine must all be taken into account when designing a part.

SUMMARY OF THE INVENTION

In a broad aspect, a manufacturing process for fabricating a part uses additive manufacturing techniques to fabricate an object including the part in an uncured or incompletely cured form. In general, the additive fabrication is an iterative process, where the material that forms the object is deposited incrementally, for example, in layers. During an additive fabrication stage of the manufacturing process, the material for the part of the object, referred to as "build material," is deposited in a liquid phase.

In the additive fabrication stage, additive manufacturing techniques are used to fabricate the object to include a solid mold containing the build material of the part, for example with the solid mold forming a cavity with a shape of the part. Rather than completely fabricating the solid mold and then filling the mold with build material, uncured build material is incrementally added to the object as the mold is fabricated.

In the overall manufacturing process, which includes the additive fabrication stage as well as a subsequent or overlapping part curing stage, the build material for the part of the object undergoes two distinct mechanisms: a phase change mechanism and a polymerization mechanism.

The phase change mechanism occurs during the additive fabrication stage and causes a phase change of the build material from a liquid to a non-liquid (e.g., at least partially solid, semi-solid, and/or quasi-solid), where the phase change is generally not due to polymerization. In this non-liquid form the build material is sufficiently solidified for subsequent incremental deposit of material on to it (e.g., the non-liquid build material can support the weight of incrementally added material and/or the force of the material as it is jetted to, for example, prevent mixing between the build material and the support material).

The polymerization mechanism occurs after, or at least partly after, the additive fabrication of the object during the curing stage. This mechanism cures the build material by a polymerization process. In some examples, the polymerization mechanism is initiated after additive fabrication of the object is complete. In other examples, the polymerization mechanism is initiated before additive manufacturing is complete, for example, being initiated during the phase change mechanism (e.g., with both mechanisms being initiated at the same time, or the polymerization mechanism being initiated during the phase change mechanism).

After the build material is sufficiently cured (e.g., sufficiently polymerized) in the curing stage to allow removal of the mold, the manufacturing process enters a part removal stage for removal of the mold. Removal of the mold yields the fabricated part.

In an general aspect, a method for manufacturing a part includes fabricating, in an additive fabrication stage, an object including build material for the part in an uncured or incompletely cured form and a solid mold forming a cavity with a shape of the part and containing the build material and curing the part, in a curing stage that occurs at least partially after the additive fabrication stage. In the additive fabrication stage, material that forms the object is deposited incrementally including depositing build material for the part in a liquid phase and depositing material for the mold, and during the additive fabrication stage the material for the mold solidifies to form the solid mold. The build material undergoes a phase change mechanism and a distinct polymerization mechanism, the phase change mechanism occurring during the additive fabrication stage and causing a phase change of the build material from a liquid to a non-liquid. The polymerization mechanism occurs during the curing stage and occurs at least partly after the additive fabrication stage of the object, and cures the build material by a polymerization process.

Aspects may include one or more of the following features.

The polymerization mechanism may be initiated after the additive fabrication stage. The polymerization mechanism may be initiated before additive manufacturing stage is complete. The polymerization mechanism may be initiated before completion of the phase change mechanism. The phase change mechanism and the polymerization mechanism may be initiated at the same time.

The method may further include, after the build material is at least partially cured in the curing stage, a part removal stage including removing the mold yield the fabricated part. The material for the mold may solidify by a curing process. Curing the deposited mold material may include causing the deposited mold material to polymerize. The mold material may include a photo-curable material and the curing process includes applying light to the deposited mold material. The material for the mold may solidify by undergoing a physical phase change. Undergoing the physical phase change may include allowing the material for the mold to cool.

The material for the mold may include a wax. Incrementally depositing material for the object may include depositing a number of layers of material. At least some layers of material of the number of layers of material may be deposited using a jetting process. The material for the mold deposited in a second layer of the number of layers may be deposited on the build material deposited in a first layer of the number of layers deposited prior to the second layer. At least some of the layers may be added using two or more print heads.

Depositing the build material may include depositing a polymerization initiation catalyst. Depositing the layers may include depositing a number of material components from a corresponding number of print heads, a first print head of the number of print heads depositing the polymerization initiation catalyst. The polymerization initiation catalyst may be mixed with the build material. Incrementally depositing the layers may further include depositing at least some layers including only mold material.

The method may further include removing the solid mold. Removing the solid mold may include at least one of dissolving the solid mold, mechanically removing the solid mold, and liquefying the solid mold. The build material may include a wax after the phase change mechanism. The build material may include a liquid prior to the phase change mechanism. Curing the part may include heating the build material. The build material may undergo a phase change of the build material to a liquid phase during the curing stage.

The build material may include a polymerization precursor. The cured mold material may be substantially stable under a build curing condition. The cured build material may be substantially stable under a mold removal condition. The non-liquid may be sufficiently solidified for subsequent incremental deposit of material onto it during the additive fabrication stage.

In another general aspect, a method receives a model representing a part to be fabricated. The method processes the model to determine characteristics (e.g., shape and material) of a mold that can be used to fabricate the part using the additive manufacturing techniques described above.

Aspects may have one or more of the following advantages.

Aspects advantageously are capable of fabricating parts with shapes and from materials that are not possible with conventional molding techniques (e.g., injection molding).

Aspects advantageously provide a more agile design process as compared to conventional molding processes because the mold can be continuously refined without incurring the costs and efforts associated with making a new mold for conventional molding.

Aspects are advantageously capable of producing polymers that have improved mechanical properties and are more isotropic as compared to those produced by conventional inkjet printed parts.

Without wishing to be bound by theory, it is understood that the methods and materials of the present disclosure may carry one or more potential advantages over the existing methods and materials in the field. For example, the methods and materials may allow for a delayed bulk polymerization of the build materials, which could provide a cured materials containing polymers that are more isotropic and/or have a more uniformed structure, as compared to cured materials prepared by layer-by-layer polymerization. For another example, the methods may be suitable for using a wider range of polymerization conditions, including with slower rates of polymerization than typical.

Other features and advantages of the invention are apparent from the following description, and from the claims.

BRIEF DESCRIPTION OF THE DRAWINGS

FIG. 16 shows a curing process yielding the fabricated object with a cured part therein.
FIG. 17 shows a mold removal process yielding a fabricated part.

DETAILED DESCRIPTION

1 Overview

Figure 1:
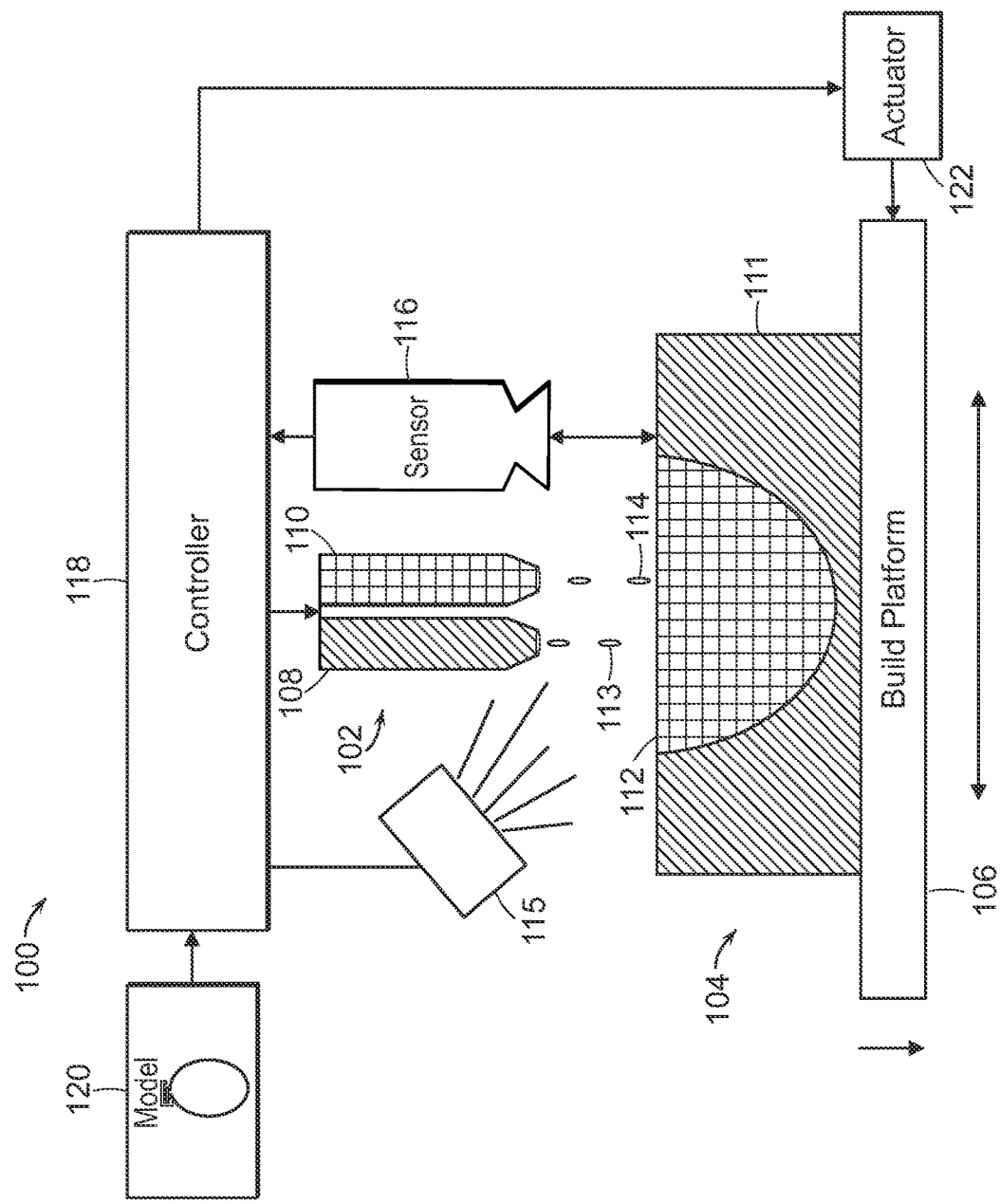
FIG. 1 is an additive manufacturing printer.

The description below relates to a manufacturing process that uses additive fabrication, for example, using a jetting-based 3D printer 100 as shown in FIG. 1. Very generally, the manufacturing process includes three temporal phases: an additive fabrication stage, a part curing stage, and a part removal stage. As is described in greater detail below, in some examples, the part curing stage occurs entirely after the additive fabrication stage. In other examples the additive fabrication stage and the part curing stage partially overlap.

In the additive fabrication stage, additive fabrication is used to fabricate an object 104 including a solid (e.g., cured) mold structure 111 that forms a cavity (e.g., closed structure or open vessel) defining a shape of the part 112, where the cavity is filled with a semi-solid, uncured or partially cured material in the shape of the part 112. The solid mold structure 111 and/or the semi-solid material are added, layer by layer, to form the object 104.

In the part curing stage, at least some of which occurs at a time after completion of the additive fabrication stage, the object 104 including the filled mold structure 111 undergoes a curing process for polymerizing the material in the cavity.

In the additive manufacturing stage and the part curing stage, the material used to form the part 112 (sometimes referred to as "build material) undergoes two distinct mechanisms: a phase change mechanism and a polymerization mechanism.

The phase change mechanism occurs during the additive fabrication stage and causes a phase change of the build material from a liquid to a non-liquid (e.g., at least partially solid, semi-solid, and/or quasi-solid, where these three terms may be used interchangeably herein). In this non-liquid form the build material is sufficiently solidified for subsequent incremental deposit of material on to it (e.g., the non-liquid build material can support the weight or force of incrementally added material).

The polymerization mechanism occurs after, or at least partly after, the additive fabrication of the object 104 during the curing stage. This mechanism cures the build material by a polymerization process. In some examples, the polymerization mechanism is initiated after additive fabrication of the object is complete. In other examples, the polymerization mechanism is initiated before additive manufacturing is complete, for example, being initiated during the phase change mechanism (e.g., with both mechanisms being initiated at the same time, or the polymerization mechanism being initiated after initiation and during the phase change mechanism).

In the part removal stage, the solid mold structure 111 is removed, yielding the part 112. In some examples, the part removal stage occurs after the part curing stage. But in other examples, the part removal stage may overlap with the part curing stage (e.g., the part 112 is still curing but is sufficiently cured for removal from the solid mold structure 111).

2 Printer

In the additive fabrication stage, the printer 100 uses jets 102 (inkjets) to emit material for deposition of layers to form the object 104 (shown partially fabricated in FIG. 1). For the printer illustrated in FIG. 1, the object 104 is fabricated on a build platform 106, which is controlled to move relative to the jets (i.e., along an x-y plane) in a raster-like pattern to form successive layers, and in this example also to move relative to the jets (i.e., along a z-axis) to maintain a desired separation of the jets and the surface of the partially-fabricated object 104.

As illustrated, there are multiple jets 108, 110, for example with a first jet 108 being used to emit a mold material 113 to form a solid (e.g., cured or semi-cured) mold structure 111 of the object 104, and a second jet 110 being used to emit build material 114 to form an uncured or partially cured, semi-solid (e.g., a gel or a wax) part 112 in the object 104. Additional details of the properties of the mold material 113 and the build material 114 are described below.

A sensor 116 (sometimes referred to as a scanner) is positioned relative to (e.g., above) the object under fabrication 104 and is used to determine physical characteristics of the partially fabricated object. For example, the sensor 116 measures one or more of the surface geometry (e.g., a depth map characterizing the thickness/depth of the partially fabricated object) and subsurface characteristics (e.g., in the near surface comprising, for example, 10 s or 100 s of deposited layers). The characteristics that may be sensed can include one or more of a material density, material identification, and a curing state. Very generally, the measurements from the sensor 116 are associated with a three-dimensional (i.e., x, y, z) coordinate system where the x and y axes are treated as spatial axes in the plane of the build surface and the z axis is a height axis (i.e., growing as the object is fabricated).

In some examples, in the context of a digital feedback loop for additive fabrication, the additive manufacturing system builds the object by printing layers. The sensor 116 captures the 3D scan information after the printer 100 prints one or more layers. For example, the sensor 116 scans the partial object (or empty build platform), then the printer prints a layer (or layers) of material(s). Then, the sensor 116 scans the (partially built) object again. The new depth sensed by the sensor 116 should be at a distance that is approximately the old depth minus the thickness of layer (this assumes that the sensor 116 is positioned on the top of the of the object being built and the object is being built from the bottom layer to the top layer and the distance between the sensor 116 and the build platform is unchanged). Various types of sensing such as optical coherence tomography (OCT) or laser profilometry can be used to determine depth and volumetric information related to the object being fabricated.

A controller 118 uses a model 120 of the object to be fabricated to control motion of the build platform 106 using a motion actuator 122 (e.g., providing three degrees of motion) and control the emission of material from the jets 102 according to non-contact feedback of the object characteristics determined via the sensor 116.

3 Manufacturing Process

3.1 Example 1

Figure 2:
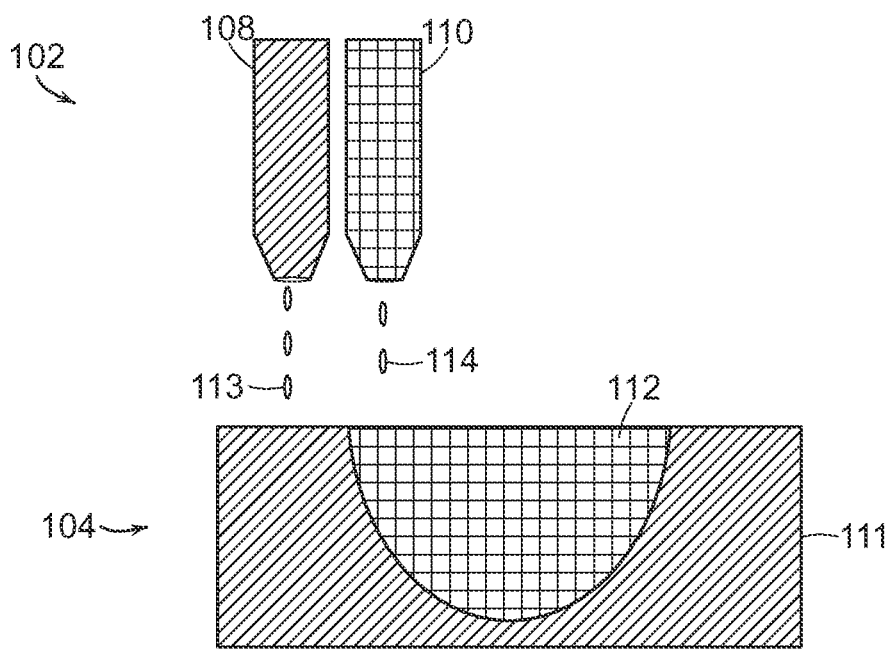
FIG. 2 shows a first state of a manufacturing process.

Referring to FIG. 2, the printer 100 (only the jets 102 of the printer 100 are shown for simplicity in FIG. 2) is in the midst of the additive fabrication stage of the manufacturing process where an object 104 including a three-dimensional, substantially "egg-shaped" semi-solid part 112 (shown in a two-dimensional cross-section for simplicity in FIG. 2) is formed inside a solid mold structure 111. In this example, the semi-solid part 112 remains in an uncured state throughout the additive fabrication stage and the part curing stage begins by initiating the polymerization mechanism after the additive fabrication stage is complete.

As is described above, the semi-solid part 112 is formed from a semi-solid build material 114 (e.g., a wax or gel) deposited by the second jet 110. In this example, the build material 114 that is deposited by the second jet 110 is a curable precursor material including a mixture of a monomer and a polymerization initiation catalyst. The build material 114 is emitted from the second jet 110 as a liquid. During deposition, the build material 114 is sometimes described as being in a build depositing condition. The deposited build material 114 undergoes the phase change mechanism wherein the build material undergoes a physical phase change to become a semi-solid after being deposited (e.g., by cooling). In this example, the polymerization mechanism is not yet initiated at this stage, and the semi-solid build material 114 is described as being in a pre-curing condition.

The solid mold structure 111 is formed from a mold material 113 (e.g., a UV curable polymer) deposited by the first jet 108. In this example, the mold material 113 is emitted from the first jet 108 as a liquid. During deposition, the mold material 113 is sometimes described as being in a mold depositing condition. At some time after the mold material is deposited, curing of the mold material commences. During curing, the mold material 113 is described as being in a mold curing condition. The mold material 113 in the mold curing condition undergoes a chemical phase change to become solid after being deposited (e.g., by undergoing a UV curing process). The solid mold material 113 is sometimes described as being in a mold pre-removal condition.

In FIG. 2, a number of layers of the object (some including both semi-solid, uncured build material and solidified mold material) are shown having been deposited such that roughly a third of the egg shaped semi-solid part 112 is formed in the solid mold structure 111.

Figure 3:
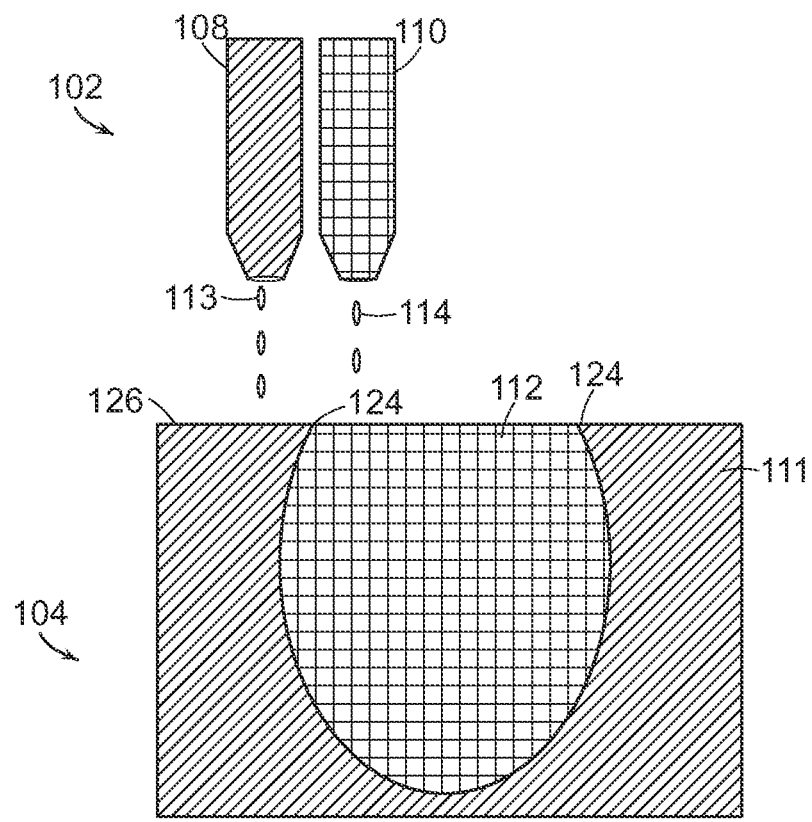
FIG. 3 shows a second state of the manufacturing process.

Referring to FIG. 3, as the additive fabrication stage progresses, the egg shaped semi-solid part 112 begins to take on the appearance of an egg, where some parts of the "egg shell" overhang parts of the interior of the egg. That is, in overhanging areas 124 of the print surface 126, the solid mold structure 111 is specified to lay on top of the semi-solid part 112 (i.e., the solid mold structure 111 overhangs the semi-solid part 112). In the overhanging areas 124, the mold material 113 is deposited onto the semi-solid, deposited build material 114 of the semi-solid part 112, which serves as a support surface for depositing the mold material 113. The semi-solid, deposited build material 114 of the semi-solid part 112 holds the deposited mold material 113 in place before and during its solidification (e.g. curing).

Figure 4:
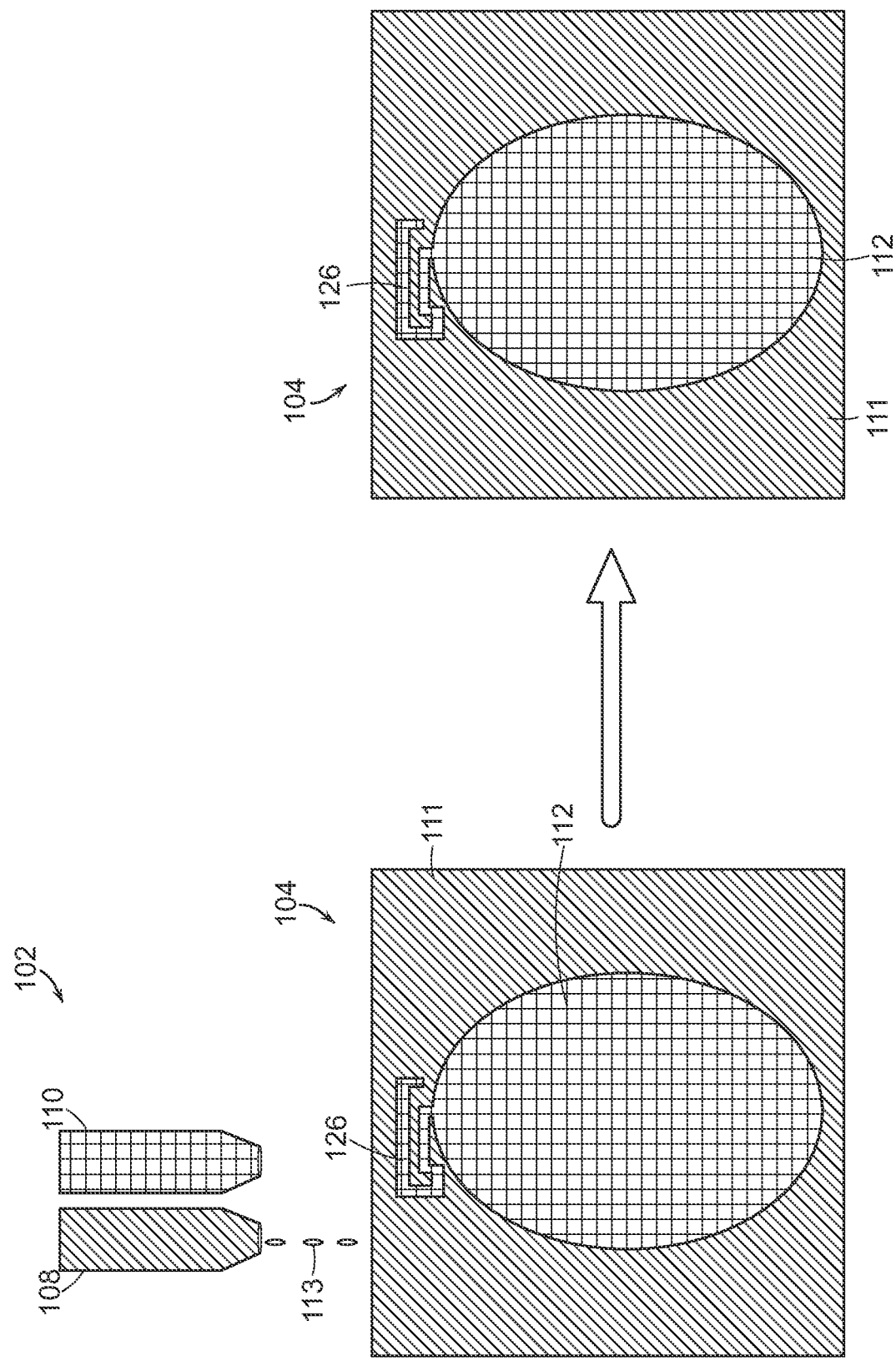
FIG. 4 shows a third state of the manufacturing process yielding a fabricated object.

Referring to FIG. 4, eventually the additive fabrication stage of the manufacturing process completes, yielding the fabricated object 104 including the semi-solid, uncured part 112 contained in the solid mold structure 111.

The semi-solid, uncured part 112 shown in FIG. 4 includes a complex structure 126. In some examples, the complex structure 126 is a feature that will still be included in the part 112 after curing. The complex structure 126 may be a structure that would be difficult to form using conventional molding techniques. In other examples, the complex structure 126 is included to compensate for effects of the curing process on the semi-solid part 112. For example, the complex structure 126 may include additional build material 114 that gravity feeds into the cavity formed in the mold structure 111 when the build material 114 of the semi-solid part 112 shrinks during curing. Alternatively, the complex structure 126 may be an open space that allows for expansion of the build material 114 of the semi-solid part 112 during curing. In yet another example, the complex structure 126 establishes a vent (not shown) to the environment in the mold structure 111 to allow gases produced during the curing process to escape. It should be appreciated that any number of other complex structures 126 can be formed for various other reasons.

Figure 5:
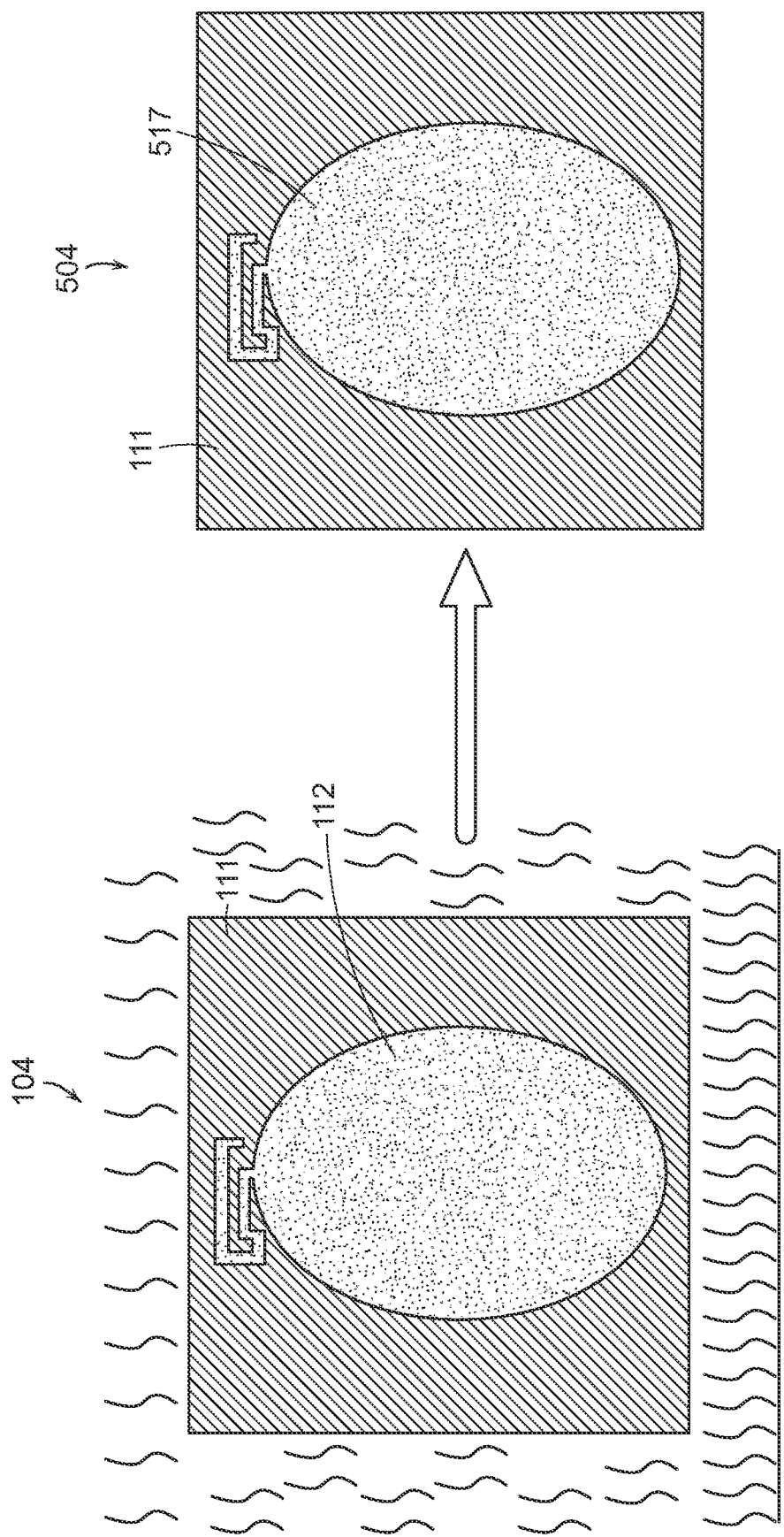
FIG. 5 shows a curing process yielding the fabricated object with a cured part therein.

Referring to FIG. 5, in the part curing stage of the manufacturing process, the fabricated object 104 is subjected to a curing process, wherein the polymerization mechanism is initiated to cure the semi-solid part 112. The part curing stage yields a cured object 504 with a cured part 512 contained in the solid mold structure 111. During the part curing stage, the semi-solid build material 114 of the part 112 is sometimes described as being in the build curing condition.

The curing process in FIG. 5 is a heating-based process. Very generally, the heating process activates the polymerization initiation catalyst (i.e., initiates the polymerization mechanism) included in the build material 114, which in turn reacts with the monomer included in the build material 114 to cause polymerization of the build material 114 of the semi-solid part 112, yielding the cured object 504 with the cured (or sufficiently cured) part 512. It should be appreciated that other types of curing processes (e.g., UV curing or curing by a curing agent) can be used. In some examples, the curing process applies different temperatures at different times to control the curing process.

Figure 6:
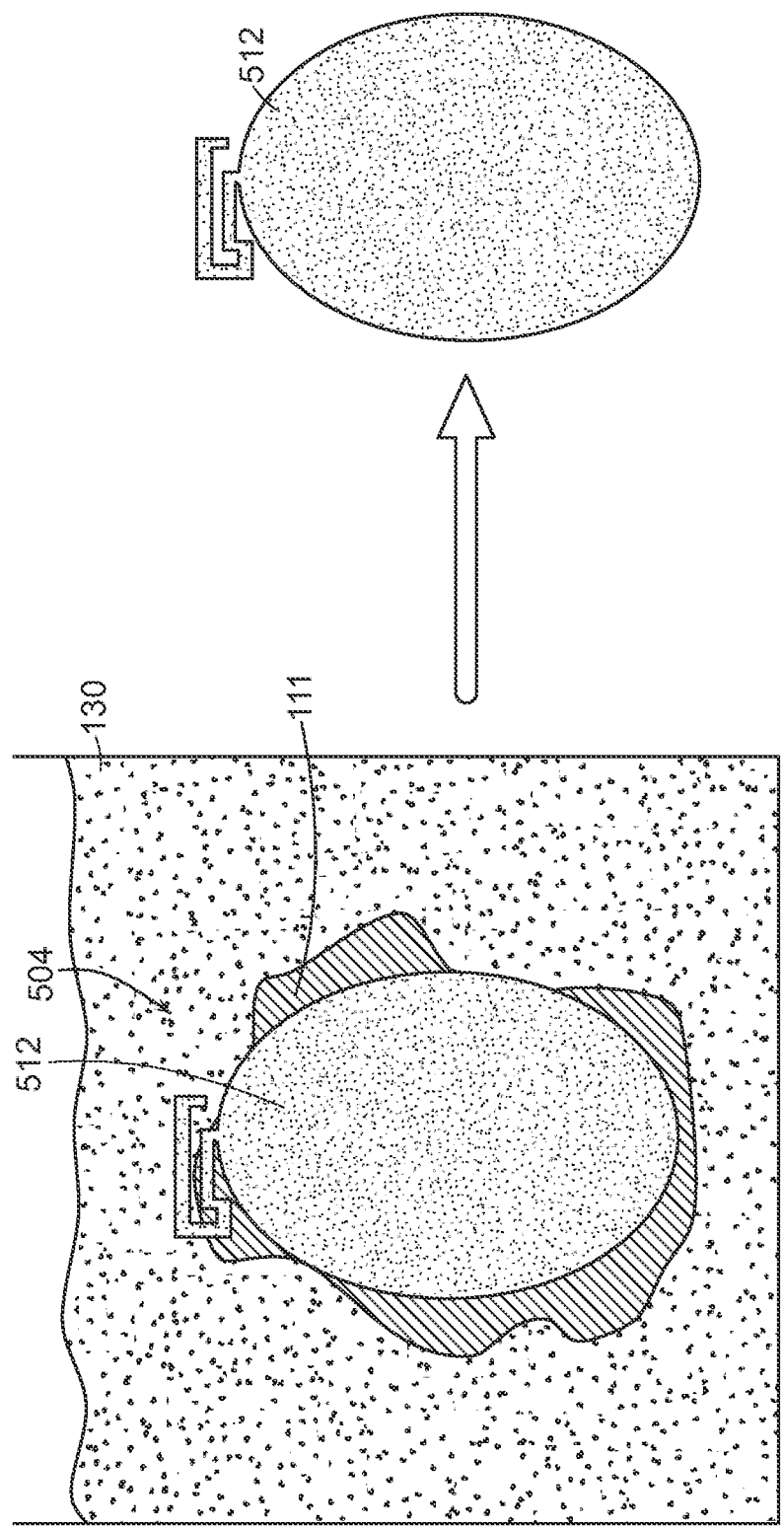
FIG. 6 shows a mold material removal process yielding a fabricated part.

Referring to FIG. 6, in the part removal stage of the manufacturing process, the solid mold structure 111 is removed from the cured object 504, yielding the cured (or sufficiently cured) part 512. During the part removal stage, the solid mold material 113 of the solid mold structure 111 is sometimes described as being in a mold removal condition.

In the example of FIG. 6, the solid mold structure 111 is soluble (e.g., water or other solvent soluble), and is removed by bathing the cured object 504 in water 130 or some other solvent to dissolve the solid mold structure. In other examples, the solid mold structure is physically removed (e.g., by breaking the solid mold structure 111 off), removed with heat, chemically removed (e.g., by a chemical reaction), or some combination of the aforementioned removal techniques.

3.2 Example 2

Figure 7:
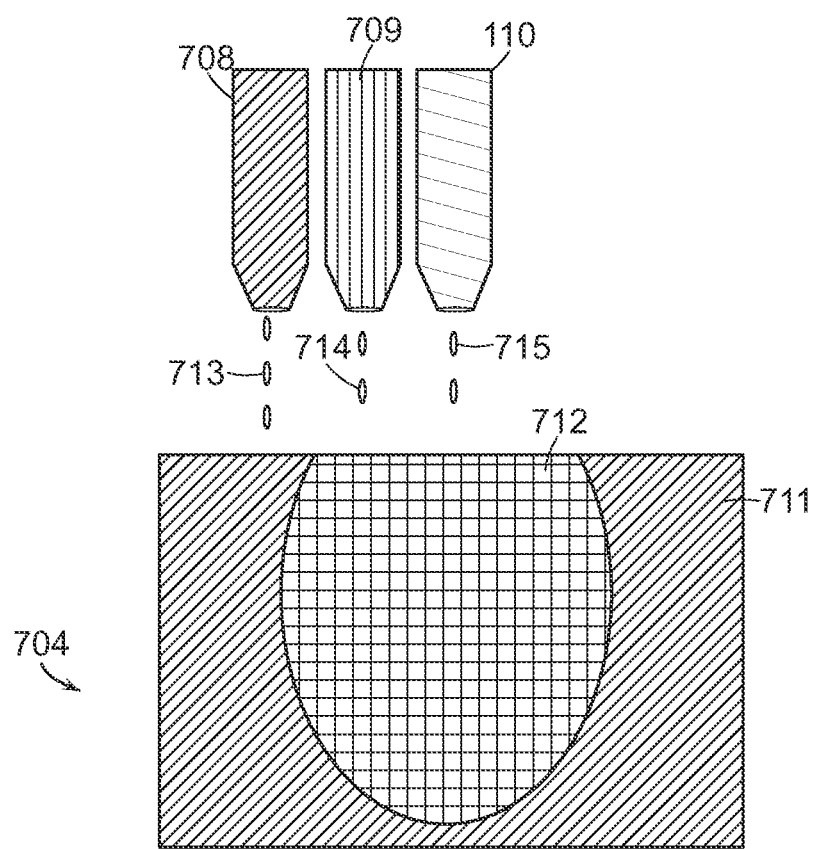
FIG. 7 shows a second manufacturing process.

Referring to FIG. 7, in the example described above two jets are used in the additive fabrication stage of the manufacturing process, one jet for depositing the mold material and another jet for depositing build material that is a mixture of a monomer and a polymerization initiation catalyst. But in the example of FIG. 7, the monomer and the polymerization initiation catalyst are deposited from separate jets and mix at a later time (e.g., when deposited or during the curing process).

That is, in FIG. 7, three jets 708, 709, 710 are used in the additive fabrication stage of the manufacturing process, with a first jet 708 being used to emit a mold material 713 to form a solid (e.g., cured or semi-cured) mold structure 711 of the object 704, a second jet 709 being used to emit a monomer 714 as a first component of the semi-solid (e.g., a gel or a wax), uncured part 712 in the object 704, and a third jet 710 being used to emit a polymerization initiation catalyst 715 (jetted, for example, in a diluent-solvent) to as a second component of the semi-solid, uncured part 712 in the object 704. In some examples, both the monomer 714 and the polymerization initiation catalyst 715 are emitted as a liquid and undergo a phase change mechanism (e.g., cooling) to become semi-solid. Besides this difference in how the build material of the semi-solid part 712 is formed, the manufacturing process for forming the cured part is much the same as the process described above for FIGS. 1-6.

3.3 Example 3

Figure 8:
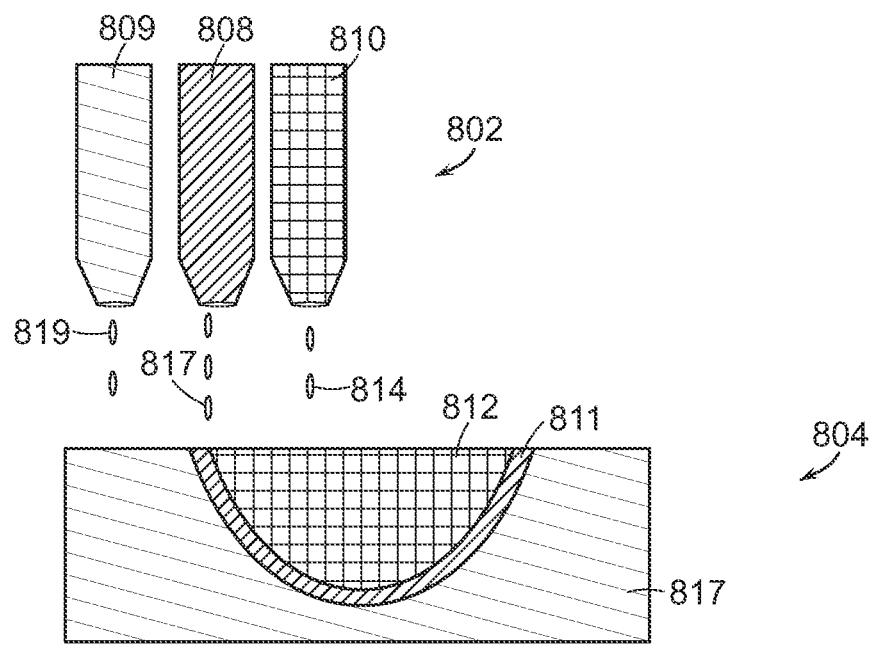
FIG. 8 shows a first state of a third manufacturing process.

Referring to FIG. 8, in another example of the manufacturing process, the printer 100 (including three jets 802 in this example) is in the midst of the additive fabrication stage of the manufacturing process where an object 804 including a three-dimensional, substantially "egg-shaped" semi-solid part 812 (shown in a two-dimensional aspect for simplicity in FIG. 8) is formed inside a solid mold structure 811, which is in turn formed inside of (e.g., supported by) a wax support structure 817. In this example, the semi-solid part 812 remains in an uncured state throughout the additive fabrication stage and the part curing stage begins by initiating the polymerization mechanism after the additive fabrication stage is complete.

As was the case in previous examples, the semi-solid part 812 is formed from a semi-solid build material 814 (e.g., a wax or gel) deposited in liquid form prior to the phase change mechanism by a second jet 810. In this example, the build material 814 that is deposited by the second jet 810 is a curable precursor material including a monomer and a polymerization initiation catalyst. The build material 814 is emitted from the second jet 810 as a liquid. During deposition, the build material 814 is sometimes described as being in a build depositing condition. The deposited build material 814 undergoes the phase change mechanism wherein the build material undergoes a physical phase change to become a semi-solid after being deposited (e.g., by cooling). In this example, the polymerization mechanism is not yet initiated at the stage, and the semi-solid build material 814 is sometimes described as being in a build pre-curing condition.

The solid mold structure 811 is formed from a mold material 813 (e.g., a UV curable polymer) deposited by a first jet 808. In this example, the mold material 813 is emitted from the first jet 808 as a liquid. During deposition, the mold material 813 is sometimes described as being in a mold depositing condition. At some time after the mold material 813 is deposited, curing of the mold material 813 commences. During the curing process, the mold material 813 is described as being in a mold curing condition. The mold material 813 in the mold curing condition undergoes a chemical phase change to become solid (sometimes described as being in a mold pre-removal condition) after being deposited (e.g., by undergoing a UV curing process).

The wax support structure 817 is formed from a wax support material 819 (e.g., ester waxes, amide waxes, urethane waxes, or urea waxes) deposited by a third jet 809. In this example, the wax support material 819 is emitted from the third jet 809 as a liquid and undergoes a physical phase change to become a solid or semi-solid after being deposited (e.g. by cooling).

In FIG. 8, a number of layers of the object (some including semi-solid, uncured build material, solidified mold material, and wax support material) are deposited such that roughly a third of the egg shaped semi-solid part 812 is formed in the solid mold structure 811 and wax support structure 817.

Figure 9:
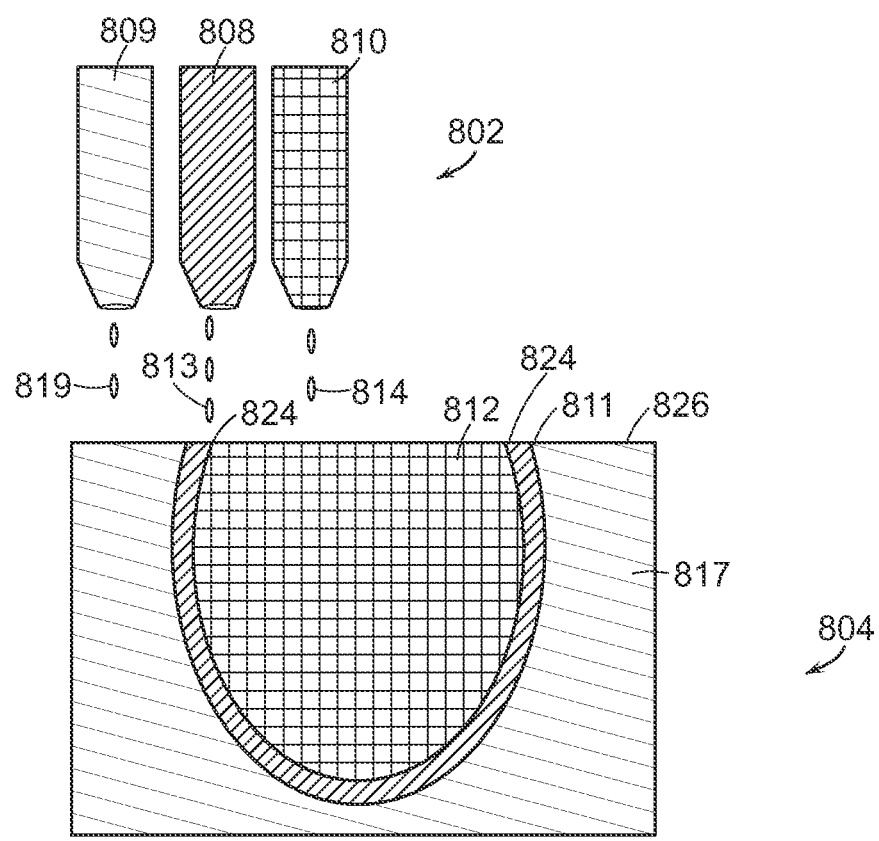
FIG. 9 shows a second state of the third manufacturing process.

Referring to FIG. 9, as the additive fabrication stage progresses, the egg shaped semi-solid part 812 begins to take on the appearance of an egg, where some parts of the "egg shell" overhang parts of the interior of the egg. That is, in overhanging areas 824 of the print surface 826, the wax support structure 817 is specified to lay on top of the solid mold structure 811 (i.e., the wax support structure 817 overhangs the solid mold structure 811), and the solid mold structure 811 is specified to lay on top of the semi-solid part 812 (i.e., the solid mold structure 811 overhangs the semi-solid part 812). In the overhanging areas 824, the mold material 813 is deposited onto the semi-solid, deposited build material 814 of the semi-solid part 812, which serves as a supporting surface for depositing the mold material 813. Similarly, the wax support material 819 is deposited onto the solid mold material 813 of the solid mold structure 811 in the overhanging areas 824. That is, the semi-solid, deposited build material 814 of the semi-solid part 812 holds the deposited mold material 813 in place before and during its solidification (e.g., curing) and the mold material 813 of the solid mold structure 811 holds the wax support material 819 in place as it cools.

Figure 10:
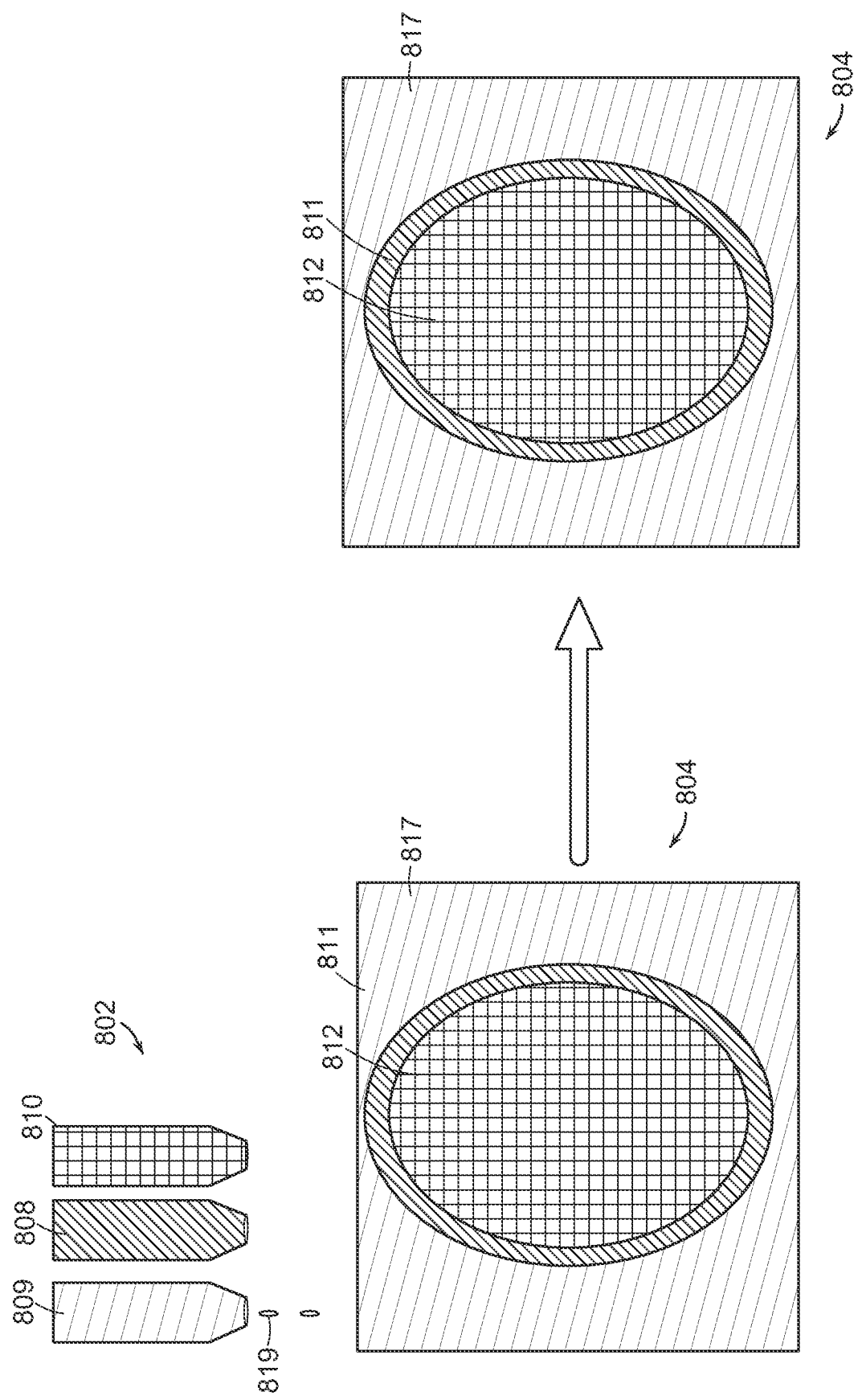
FIG. 10 shows a third state of the third manufacturing process yielding a fabricated object.

Referring to FIG. 10, eventually the additive fabrication stage of the manufacturing process completes, yielding the fabricated object 804 including the semi-solid part 812 contained in the solid mold structure 811, which is in turn contained in the wax support structure 817. The semi-solid, uncured part 812 of the fabricated object 804 at this stage is sometimes described as being in a build pre-curing condition.

Figure 11:
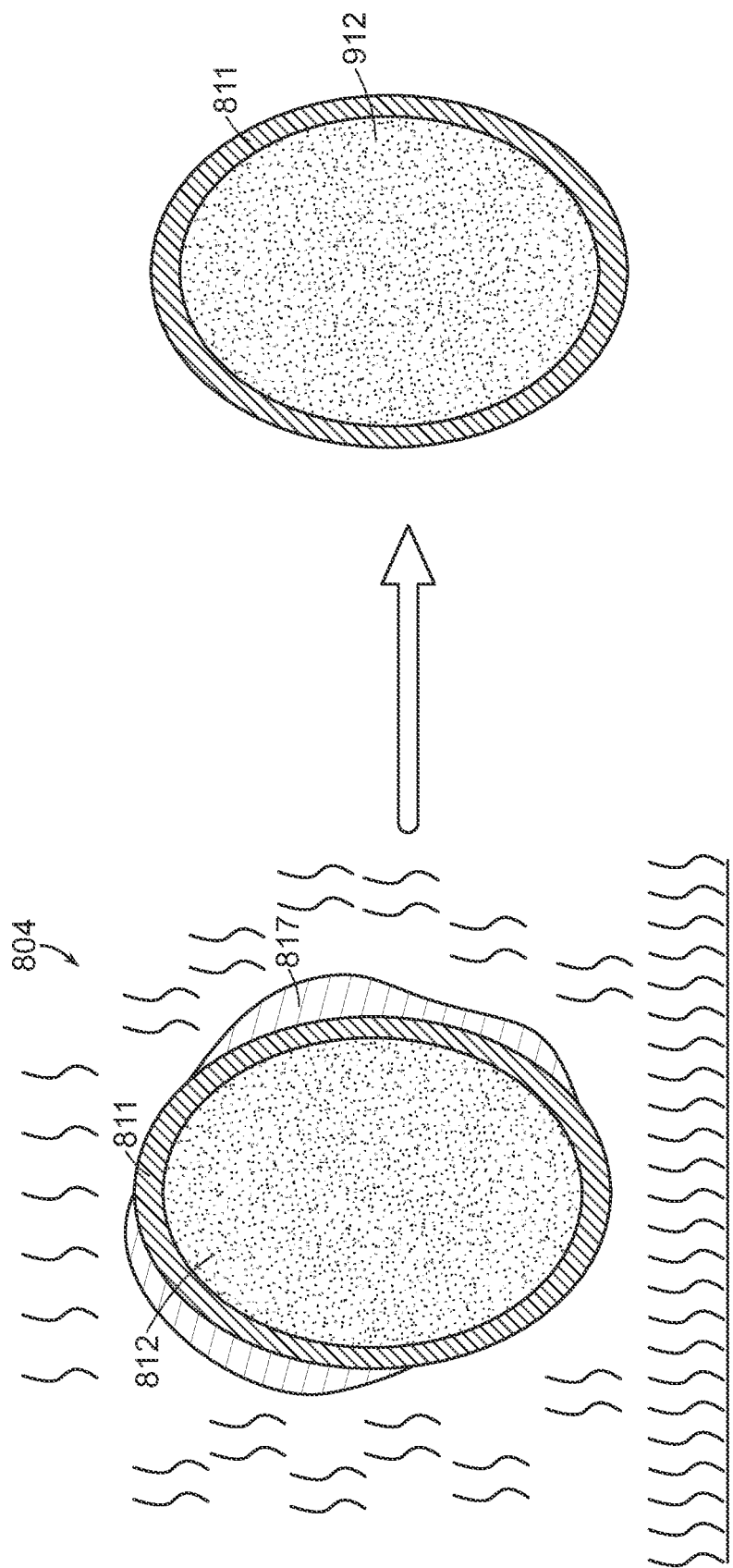
FIG. 11 shows a curing process yielding the fabricated object with a cured part therein.

Referring to FIG. 11, the fabricated object 804 is then subjected to a combined part removal/curing stage of the manufacturing process to remove the wax support structure 817 and cure the semi-solid part 812. In the curing aspect of the part removal/curing stage, the polymerization mechanism is initiated to cure the semi-solid part 812. The part removal/curing stage yields a cured part 912 contained in the solid mold structure 811. In some examples, the part removal/curing stage substantially simultaneously removes the wax support structure 817 and cures the semi-solid part 812. In other examples, the removal and curing occur in two sequential steps. While the semi-solid part 812 undergoes the curing process in the part curing stage, it is sometimes described as being in a build curing condition.

The curing process shown in FIG. 11 is a heating-based process. Very generally, the heating process melts away the wax support structure 817 and activates the polymerization initiation catalyst (i.e., initiates the polymerization mechanism) included in the build material 814, which in turn reacts with the monomer included in the build material 814 to cause polymerization of the build material 814 of the semi-solid part 812. This yields the cured (or sufficiently cured) part 912 contained in the solid mold structure 811.

In some examples, the heating process operates at a single temperature that is sufficient to both melt the wax support structure and cure the build material 814. In other examples, the curing process applies different temperatures at different times to control the melting and/or curing process. It should be appreciated that other types of curing processes (e.g., UV curing or curing by a curing agent) can also be used.

Figure 12:
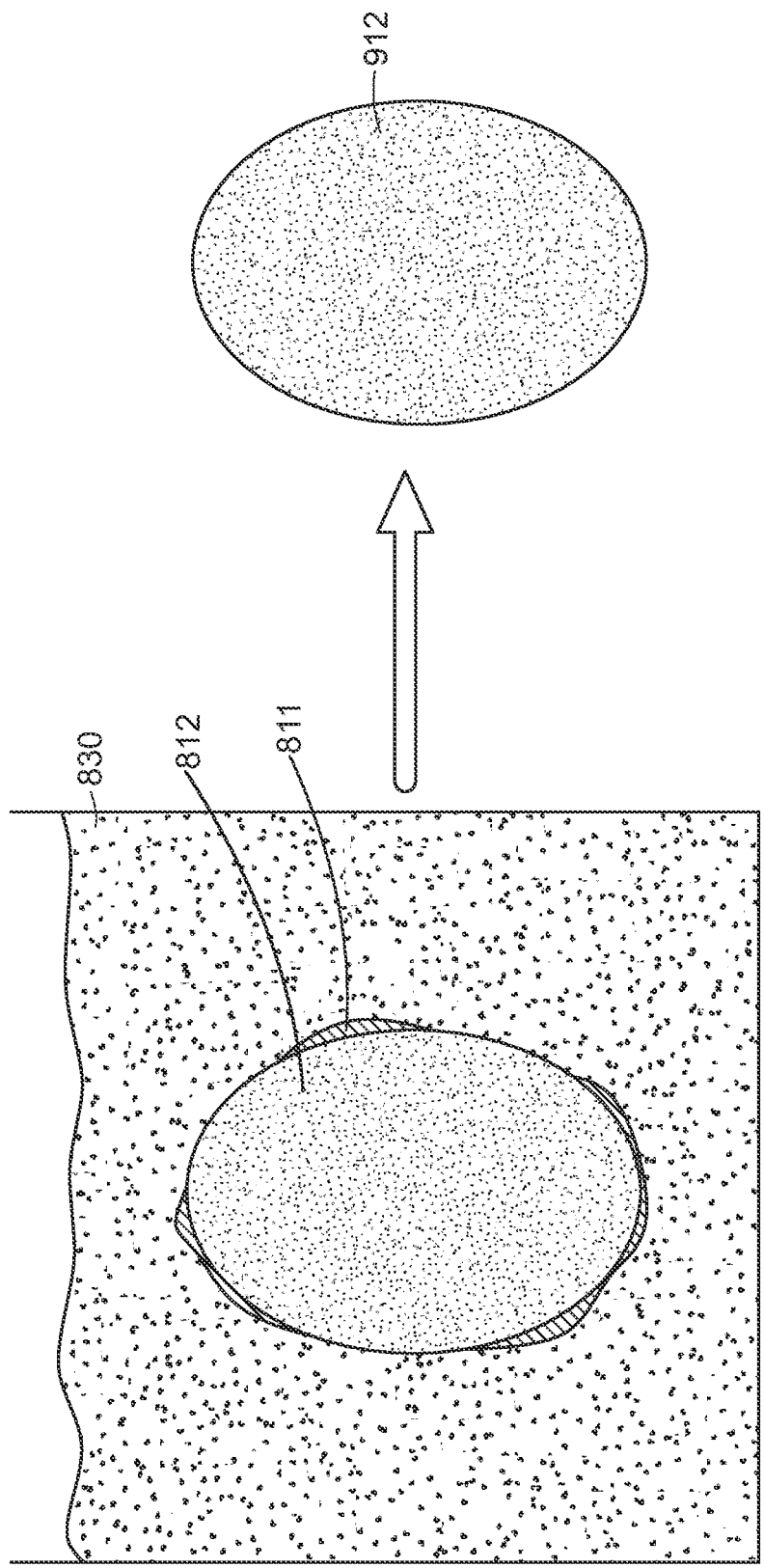
FIG. 12 shows a mold material removal process yielding a fabricated part.

Referring to FIG. 12, in the part removal stage of the manufacturing process, the solid mold structure 811 is removed from the cured (or sufficiently cured) part 912. During the removal stage, the solid mold material 813 of the solid mold structure 811 is sometimes described as being in a mold removal condition.

In the example of FIG. 12, the solid mold structure 811 is soluble (e.g., water or other solvent soluble), and is removed by bathing the cured part 912 contained in the solid mold structure 811 in water 830 or some other solvent to dissolve the solid mold structure 811. In other examples, the solid mold structure 811 is physically removed (e.g., by breaking the solid mold structure 811 off), removed with heat, chemically removed (e.g., by a chemical reaction), or some combination of the aforementioned removal techniques.

3.4 Example 4

Figure 13:
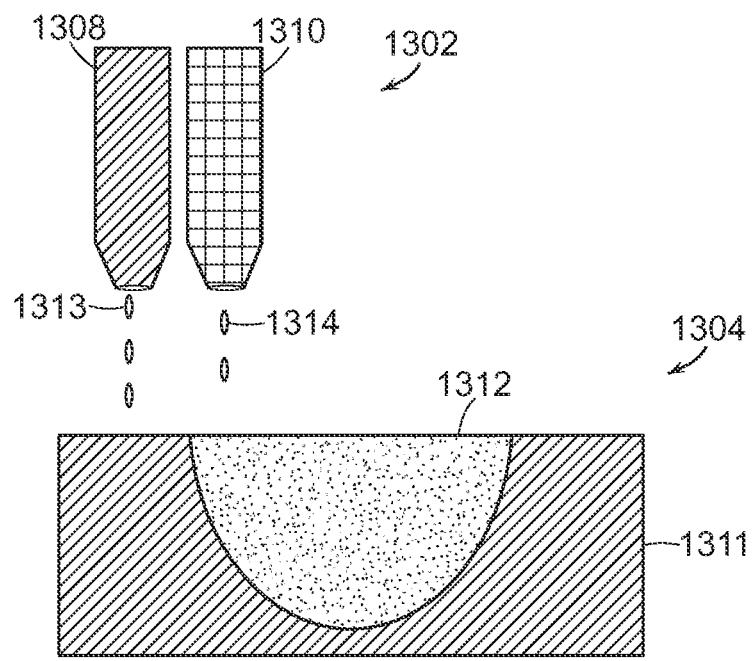
FIG. 13 shows a first state of a fourth manufacturing process.

Referring to FIG. 13, in another example of the manufacturing process, the printer 100 (only the jets 1302 of the printer 100 are shown for simplicity in FIG. 13) is in the midst of the additive fabrication stage of the manufacturing process where an object 1304 including a three-dimensional, substantially "egg-shaped" semi-solid part 1312 (shown in a two-dimensional cross-section for simplicity in FIG. 13) is formed inside a solid mold structure 1311. In this example, the semi-solid part 1312 begins the curing stage, including undergoing the polymerization mechanism, during the additive fabrication stage. The curing stage continues after the additive fabrication stage is complete.

As is described above, the semi-solid part 1312 is formed from a semi-solid build material 1314 (e.g., a wax or gel) deposited by the second jet 1310. In this example, the build material 1314 that is deposited by the second jet 1310 is a curable precursor material including a mixture of a monomer and a polymerization initiation catalyst. The build material 1314 is emitted from the second jet 1310 as a liquid. During deposition, the build material 1314 is sometimes described as being in a build depositing condition. The deposited build material 1314 undergoes the phase change mechanism wherein the build material undergoes a physical phase change to become a semi-solid after being deposited (e.g., by cooling). In this example, the polymerization mechanism is initiated either simultaneously with the phase change mechanism or at sometime soon thereafter (e.g., by application of UV light or some other trigger) such that the part curing stage commences. In the event that the polymerization mechanism is initiated after the phase change mechanism, the semi-solid build material 1314 is described as being in a pre-curing condition when the phase change mechanism is complete and the polymerization mechanism is not yet initiated. Once the polymerization mechanism, the build material 1314 is described as being in a build curing condition.

The solid mold structure 1311 is formed from a mold material 1313 (e.g., a UV curable polymer) deposited by the first jet 1308. In this example, the mold material 1313 is emitted from the first jet 1308 as a liquid. During deposition, the mold material 1313 is sometimes described as being in a mold depositing condition. At some time after the mold material is deposited, curing of the mold material commences. During curing, the mold material 1313 is described as being in a mold curing condition. The mold material 1313 in the mold curing condition undergoes a chemical phase change to become solid after being deposited (e.g., by undergoing a UV curing process). The solid mold material 1313 is sometimes described as being in a mold pre-removal condition.

In FIG. 13 a number of layers of the object (some including both semi-solid, uncured build material and solidified mold material) are shown having been deposited such that roughly a third of the egg shaped semi-solid part 1312 is formed in the solid mold structure 1311.

Figure 14:
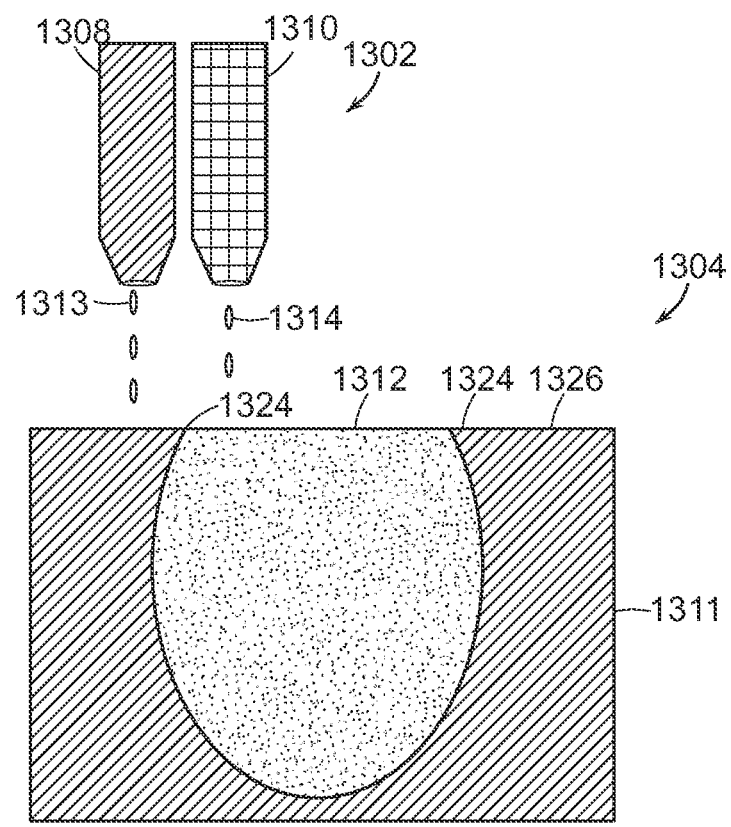
FIG. 14 shows a second state of the fourth manufacturing process.

Referring to FIG. 14, as the additive fabrication stage progresses, the egg shaped semi-solid part 1312 begins to take on the appearance of an egg, where some parts of the "eggshell" overhang parts of the interior of the egg. That is, in overhanging areas 1324 of the print surface 1326, the solid mold structure 1311 is specified to lay on top of the semi-solid part 1312 (i.e., the solid mold structure 1311 overhangs the semi-solid part 1312). In the overhanging areas 1324, the mold material 1313 is deposited onto the semi-solid, deposited build material 1314 of the semi-solid part 1312, which serves as a support surface for depositing the mold material 1313. The semi-solid, deposited build material 1314 of the semi-solid part 1312 holds the deposited mold material 1313 in place before and during its solidification (e.g. curing).

Figure 15:
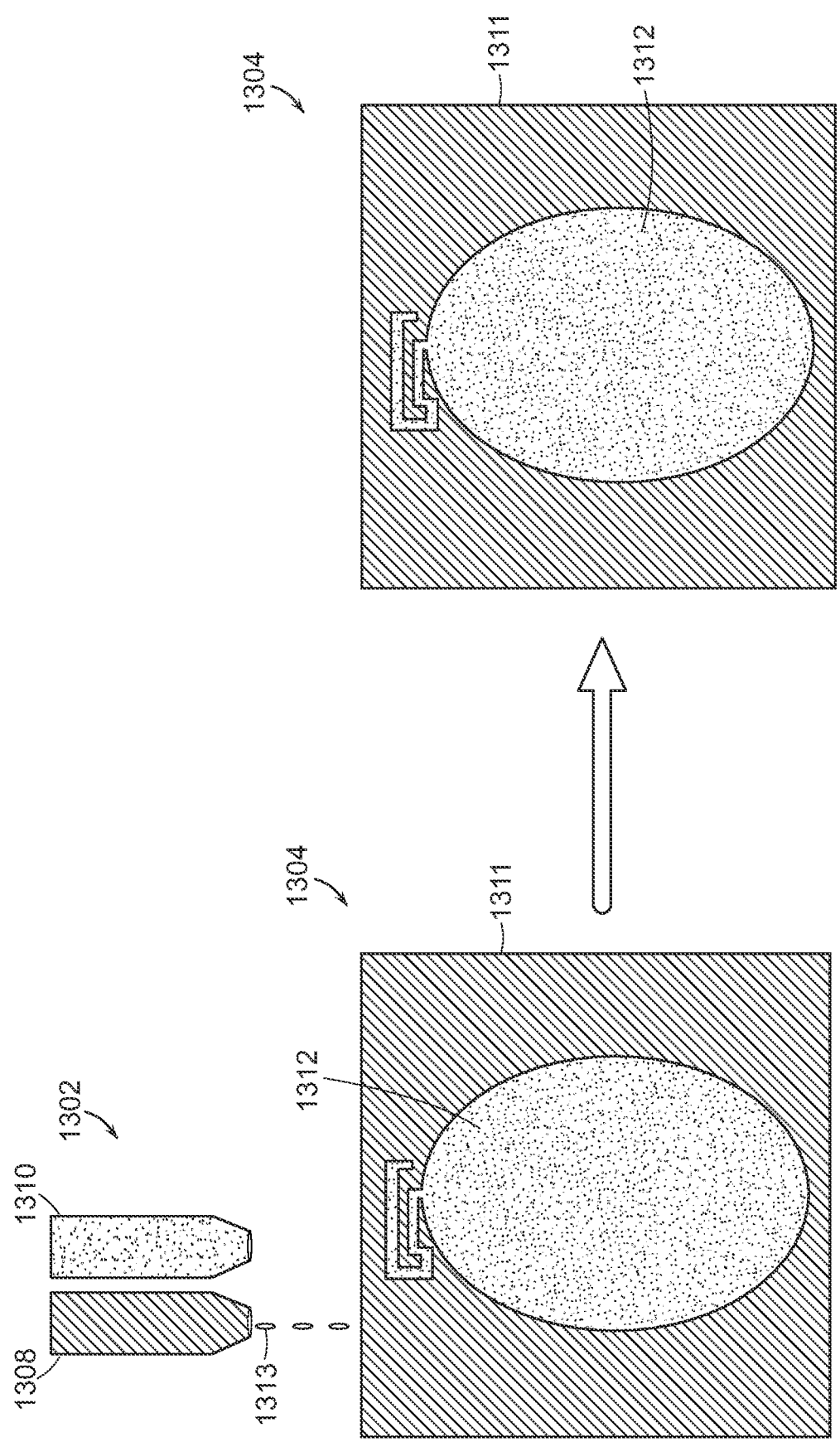
FIG. 15 shows a third state of the fourth manufacturing process, yielding a fabricated object.

Referring to FIG. 15, eventually the additive fabrication stage of the manufacturing process completes, yielding the fabricated object 1304 including the semi-solid, partially cured part 1312 contained in the solid mold structure 1311.

Referring to FIG. 16, the part curing stage of the manufacturing process continues and eventually yields a cured object 1604 with a cured part 1612 contained in the solid mold structure 1311.

Note that there is no additional curing process in FIG. 16—the polymerization mechanism initiated during the additive fabrication stage simply continues without any additional influence. However, it should be noted that there could be additional steps taken to cure the partially cured part 1312 after the additive fabrication stage is complete. For example, the fabricated object 1304 including the partially cured part 1312 could be subjected to a heating step (as described above) after the additive fabrication stage is complete.

Referring to FIG. 17, in the part removal stage of the manufacturing process, the solid mold structure 1311 is removed from the cured object 1604, yielding the cured (or sufficiently cured) part 1612. During the part removal stage, the solid mold material 1313 of the solid mold structure 1311 is sometimes described as being in a mold removal condition.

In the example of FIG. 6, the solid mold structure 1311 is soluble (e.g., water or other solvent soluble), and is removed by bathing the cured object 1604 in water 1730 or some other solvent to dissolve the solid mold structure. In other examples, the solid mold structure is physically removed (e.g., by breaking the solid mold structure 1311 off), removed with heat, chemically removed (e.g., by a chemical reaction), or some combination of the aforementioned removal techniques.

4 Material Properties

Very generally, the build and mold materials described above are chosen such that an uncured or partially cured part can be fabricated, where at least some of the curing of the fabricated part occurs in the solid mold at some time after fabrication of the part.

4.1 Build Materials

In some examples, the build material is a mixture of a precursor and a polymerization initiation catalyst and possibly a "gelling" component (e.g., a wax). The build material is deposited in the build depositing condition (e.g., as a liquid) and, by a phase change mechanism, "gels" to form a semi-solid material (sometimes described as a pre-cured condition). The gelling of the build material is caused by a physical state change (e.g., cooling) and is not caused by chemical changes such as polymerization or partial polymerization (though in some examples, it is caused by a non-polymerization chemical change). In some examples, at a time during the additive fabrication stage or after the additive manufacturing stage is complete, a part curing stage initiates a polymerization mechanism, causing the precursor and the polymerization initiation catalyst of the build material to react, curing the build material in the build curing condition (e.g., by polymerization). In some examples, the curing process of the part curing stage causes liquification of the build material.

In some embodiments, the build material is deposited (e.g., jetted) under a build depositing condition (e.g., build jetting condition).

In some embodiments, the build material is cured under a build curing condition.

In some embodiments, the build material is a liquid under the build depositing condition (e.g., the build jetting condition).

In some embodiments, the build material is a wax when in the pre-curing condition.

In some embodiments, the build material has a melting point being the same or lower than the temperature of the build depositing condition.

In some embodiments, the build material has viscosity ranging from about 5 cp to about 100 cp at the temperature of the build depositing condition.

In some embodiments, upon deposition, the build material is converted to a solid, semi-solid, or quasi-solid (e.g., via a phase change).

In some embodiments, upon deposition, the build material is converted to a solid, semi-solid, or quasi-solid by cooling.

In some embodiments, the build material is converted to a solid by a non-polymerization chemical change.

In some embodiments, the build material is UV curable.

In some embodiments, the build material is thermally curable.

In some embodiments, the build material is chemically curable by a curing catalyst or a curing agent.

In some embodiments, the build material is substantially stable (e.g., chemically and/or physically) toward the mold material.

In some embodiments, the build material is substantially stable (e.g., chemically and/or physically) under the mold curing condition (e.g., when exposed to UV radiation).

In some embodiments, the build material is substantially stable (e.g., chemically and/or physically) toward the cured mold material.

In some embodiments, the build material comprises a precursor (e.g., a monomer or a protected monomer) for a polymer.

In some embodiments, the precursor is a precursor for a polyamide (e.g., polyamide 6).

In some embodiments, the precursor is a precursor for a polyethersulfone (PES).

In some embodiments, the precursor comprises an epoxide, a polyepoxide, or a combination thereof.

In some embodiments, the precursor comprises a benzoxazine.

In some embodiments, the precursor is a precursor for ring opening polymerization In some embodiments, the precursor comprises a cyclic olefin (e.g., ring opening metathesis polymerization).

In some embodiments, the precursor comprises an acrylate.

In some embodiments, the precursor is a precursor for thiol-ene polymerization.

In some embodiments, the precursor comprises a thiol agent, an alkenyl agent, or a combination thereof.

In some embodiments, the precursor is a precursor for bulk polymerization.

In some embodiments, the build material comprises a curing catalyst.

In some embodiments, the curing catalyst cures the build material but does not cure the mold material.

In some embodiments, the build material comprises a curing agent (e.g. an agent that co-polymerizes with the polymer precursor, modifies the polymer, or cross-links the polymer).

In some embodiments, the curing agent cures the build material but does not cure the mold material.

In some embodiments, the curing agent comprises an amide, an anhydride, or a combination thereof.

4.1.1 Build Curing Conditions

In some embodiments, the build curing condition comprises or is initiated by irradiation (e.g., visible light or UV).

In some embodiments, the build curing condition comprises or is initiated by an elevated temperature condition.

In some embodiments, the build curing condition results from adding a curing catalyst.

In some embodiments, the build curing condition results from adding a curing agent (e.g. an agent that co-polymerizes with the polymer precursor, modifies the polymer, or cross-links the polymer).

In some embodiments, the build curing condition is substantially free of air (e.g., oxygen).

In some embodiments, the build curing condition is substantially free of water.

4.1.2 Cured Build Materials

In some embodiments, the cured build material is substantially stable (e.g., chemically and/or physically) toward the cured mold material In some embodiments, the cured build material is substantially stable (e.g., chemically and/or physically) under the mold removal condition.

In some embodiments, the build material comprises a polymer.

In some embodiments, the polymer is a polyamide (e.g., polyamide 6).

In some embodiments, the polymer is a polyethersulfone (PES).

In some embodiments, the polymer is formed by polymerization of epoxide.

In some embodiments, the polymer is formed by co-polymerization between epoxide, and an amide or anhydride.

In some embodiments, the polymer is a benzoxazine polymer.

In some embodiments, the polymer is formed by ring opening polymerization (e.g., ring opening metathesis polymerization).

In some embodiments, the polymer is an acrylate polymer.

In some embodiments, the polymer is a thiol-ene polymer.

4.2 Mold Materials

In some examples, the mold material is curable during the additive fabrication stage such that the solid mold structure can be at least partially cured (e.g., via a chemical change such as polymerization) as it is built. In some examples, the mold material is deposited in a mold depositing condition (e.g., as a liquid). The deposited mold material is sometimes described as being in a mold pre-curing condition. The deposited mold material enters a mold curing condition when solidification of the mold material is triggered by an excitation signal. In some examples, the excitation signal includes ultraviolet illumination emitted by a curing signal generator (e.g., the UV lamp 115 of FIG. 1), which triggers curing of the mold material shortly after it is emitted. In other examples, an excitation signal (e.g., optical, RF, etc.) is not necessarily used. Rather, the curing is triggered chemically, for example, by mixing multiple components before jetting, or jetting separate components that mix and trigger curing. In some examples, the cured mold material is described as being in a mold pre-removal condition.

In general, when the mold material of the solid mold structure is in the mold pre-removal condition, it is able to resist the process used to cure the part (e.g., heating) without deformation or break-down. The mold material is removable from cured part after curing is complete by subjecting the mold material to a mold removal condition.

In some embodiments, the mold material is deposited (e.g., jetted) under a mold depositing condition (e.g., mold jetting condition).

In some embodiments, the mold material is cured under a mold curing condition.

In some embodiments, the mold material or the cured mold material is removed under a mold removal condition.

In some embodiments, the mold material is a liquid under the mold depositing condition (e.g., the mold jetting condition).

In some embodiments, the mold material is a wax.

In some embodiments, the mold material has a melting point being the same or lower than the temperature of the mold depositing condition.

In some embodiments, the mold material has viscosity ranging from about 5 cp to about 100 cp at the temperature of the mold depositing condition.

In some embodiments, upon deposition, the mold material is converted to a solid (e.g., via a phase change).

In some embodiments, upon deposition, the mold material is converted to a solid by cooling.

In some embodiments, upon deposition, the mold material is converted to a solid by curing.

In some embodiments, the mold material is UV curable.

In some embodiments, the mold material is thermally curable.

In some embodiments, the mold material is curable toward a curing catalyst or a cuing agent.

In some embodiments, the mold material is substantially stable (e.g., chemically and/or physically) toward the build material.

In some embodiments, the mold material comprises a polymer precursor (e.g., a monomer).

In some embodiments, the mold material comprises a non-reacting compound (e.g., a wax).

In some embodiments, the mold material comprises a curing catalyst.

In some embodiments, the curing catalyst cures the mold material but does not cure the build material.

In some embodiments, the mold material comprises a curing agent (e.g. an agent that co-polymerizes with the polymer precursor, modifies the polymer, or cross-links the polymer).

In some embodiments, the curing agent cures the mold material but does not cure the build material.

4.2.1 Mold Curing Conditions

In some embodiments, the mold curing condition comprises or is initiated by irradiation (e.g., visible light or UV).

In some embodiments, the mold curing condition comprises or is initiated by an elevated temperature condition.

In some embodiments, the mold curing condition results from adding a curing catalyst.

In some embodiments, the mold curing condition results from adding a curing agent (e.g. an agent that co-polymerizes with the polymer precursor, modifies the polymer, or cross-links the polymer).

In some embodiments, the mold curing condition is substantially free of air (e.g., oxygen).

In some embodiments, the mold curing condition is substantially free of water.

4.2.2 Cured Mold Materials

In some embodiments, the cured mold material is substantially stable (e.g., chemically and/or physically) toward the build material In some embodiments, the cured mold material is substantially stable (e.g., chemically and/or physically) under the build curing condition.

In some embodiments, the cured mold material comprises a polymer.

4.2.3 Mold Removal Conditions

In some embodiments, the mold removal condition comprises adding a solvent, thereby dissolving the cured mold material.

In some embodiments, the mold removal condition comprises mechanically removing the cured mold material.

In some embodiments, the mold removal condition comprises converting the mold material from a solid to a liquid (e.g., via a phase change).

5 Alternatives

While the above examples are described in the context of a feedback based additive fabrication process, it is noted that the described process is equally applicable to non-feedback based or conventional additive fabrication processes.

The egg-like structures described above are simple examples of parts that can be fabricated using the described processes. But it should be noted the described processes are not limited to fabricating these simple shapes. Indeed, many other types of parts with more (or less) complex shapes can be (and likely would be) fabricated using the described processes.

In the examples described above, the build material is assumed to be homogenous. But it is possible that non-homogenous build materials could be used to fabricate the semi-solid part. For example, an "egg yolk" of a different build material could be included in the semi-solid part.

In the examples described above, the build material assumes a semi-solid state after it is deposited. But it is possible that the build material could be in a liquid state after being deposited. In such cases, surface tension of the liquid build material would be able to support any mold material deposited on the liquid build material before it is polymerized.

In some examples, the solid mold structure and the semi-solid, uncured or partially cured part are formed at the same time, layer-by-layer. In some examples, multiple layers of the solid mold structure are deposited and then the cavity formed by the multiple layers of the solid mold structure is filled with build material.

6 Implementations

The approaches described above can be implemented, for example, using a programmable computing system executing suitable software instructions or it can be implemented in suitable hardware such as a field-programmable gate array (FPGA) or in some hybrid form. For example, in a programmed approach the software may include procedures in one or more computer programs that execute on one or more programmed or programmable computing system (which may be of various architectures such as distributed, client/server, or grid) each including at least one processor, at least one data storage system (including volatile and/or non-volatile memory and/or storage elements), at least one user interface (for receiving input using at least one input device or port, and for providing output using at least one output device or port). The software may include one or more modules of a larger program. The modules of the program can be implemented as data structures or other organized data conforming to a data model stored in a data repository.

The software may be stored in non-transitory form, such as being embodied in a volatile or non-volatile storage medium, or any other non-transitory medium, using a physical property of the medium (e.g., surface pits and lands, magnetic domains, or electrical charge) for a period of time (e.g., the time between refresh periods of a dynamic memory device such as a dynamic RAM). In preparation for loading the instructions, the software may be provided on a tangible, non-transitory medium, such as a CD-ROM or other computer-readable medium (e.g., readable by a general or special purpose computing system or device), or may be delivered (e.g., encoded in a propagated signal) over a communication medium of a network to a tangible, non-transitory medium of a computing system where it is executed. Some or all of the processing may be performed on a special purpose computer, or using special-purpose hardware, such as coprocessors or field-programmable gate arrays (FPGAs) or dedicated, application-specific integrated circuits (ASICs). The processing may be implemented in a distributed manner in which different parts of the computation specified by the software are performed by different computing elements. Each such computer program is preferably stored on or downloaded to a computer-readable storage medium (e.g., solid state memory or media, or magnetic or optical media) of a storage device accessible by a general or special purpose programmable computer, for configuring and operating the computer when the storage device medium is read by the computer to perform the processing described herein. The system may also be considered to be implemented as a tangible, non-transitory medium, configured with a computer program, where the medium so configured causes a computer to operate in a specific and predefined manner to perform one or more of the processing steps described herein.

A number of embodiments of the invention have been described. Nevertheless, it is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

A number of embodiments of the invention have been described. Nevertheless, it is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

What is claimed is:

1. A method for manufacturing a part having a completed shape, comprising
    fabricating, in an additive fabrication stage, an object including build material for the part in an uncured or incompletely cured form and a solid mold forming a cavity comprising the completed shape and containing the build material; and
    curing the part, in a curing stage that occurs after the additive fabrication stage;
    wherein, in the additive fabrication stage, material that forms the object is deposited incrementally including depositing build material for the part in a liquid phase and depositing material for the solid mold, and during the additive fabrication stage the material for the solid mold solidifies to form the solid mold, the solid mold being removable by exposing said mold to a second temperature;
    wherein the build material comprises a wax, a monomer, and a polymerization initiator and undergoes a phase change mechanism and a distinct polymerization mechanism, the phase change mechanism occurring during the additive fabrication stage and causing a phase change of the build material from a liquid to a non-liquid, the build material being curable by exposure to a first temperature lower than the second temperature;
    wherein the distinct polymerization mechanism is initiated after the additive fabrication stage by heating the object including increasing a temperature of the object to the first temperature, the heating of the build material causing initiation of the distinct polymerization mechanism without causing removal of the solid mold, occurs during the curing stage, and occurs after the additive fabrication stage of the object, and cures the build material by the distinct polymerization mechanism,
    wherein the process further comprises heating the object to the second temperature after the curing stage to remove the solid mold from the part.

2. The method of claim 1, removal of the solid mold yields the part.

3. The method of claim 1 wherein the material for the solid mold solidifies by undergoing a physical phase change.

4. The method of claim 3 wherein undergoing the physical phase change includes allowing the material for the solid mold to cool.

5. The method of claim 1 wherein incrementally depositing material for the object includes depositing a plurality of layers of material.

6. The method of claim 5 wherein at least some layers of material of the plurality of layers of material are deposited using a jetting process.

7. The method of claim 5 wherein the material for the solid mold deposited in a second layer of the plurality of layers is deposited on the build material deposited in a first layer of the plurality of layers deposited prior to the second layer.

8. The method of claim 5 wherein at least some of the layers are added using two or more print heads.

9. The method of claim 5 wherein depositing the layers includes depositing a plurality of material components from a corresponding plurality of print heads, a first print head of the plurality of print heads depositing the polymerization initiator.

10. The method of claim 5 wherein incrementally depositing the layers further includes depositing at least some layers including only the material for the solid mold.

11. The method of claim 1 further comprising removing the solid mold.

12. The method of claim 1 wherein the build material comprises a liquid prior to the phase change mechanism.

13. The method of claim 1 wherein the build material undergoes a phase change of the build material to a liquid phase during the curing stage.

14. The method of claim 1 wherein the build material comprises a polymerization precursor.

15. The method of claim 1, wherein the solid mold is substantially stable under a build curing condition.

16. The method of claim 1, wherein the cured build material is substantially stable under a mold removal condition.

17. The method of claim 1, wherein the non-liquid is sufficiently solidified for subsequent incremental deposit of material onto it during the additive fabrication stage.

18. The method of claim 1, wherein during the curing stage and after the additive fabrication stage, the solid mold forms a solid cavity comprising the completed shape and holding the build material for the part in a liquid phase.

19. The method of claim 1, wherein depositing the build material includes depositing the monomer as a first component from a first printhead and depositing the polymerization initiator as a second component from a second printhead.

20. The method of claim 19, wherein:
    the first component is deposited as a liquid and undergoes a phase change mechanism to become semi-solid,
    the second component is deposited as a liquid and undergoes a phase change mechanism to become semi-solid, and
    the first component and the second component are substantially unmixed when in the semi-solid form.

21. The method of claim 20, wherein heating the object to the first temperature causes a second phase change mechanism occurring after the first phase change mechanism.

22. The method of claim 21, wherein heating the object to the first temperature causes the first component of the build material and the second component of the build material to transition from semi-solid state to a liquid state, allowing the polymerization initiator and the monomer to mix.

23. The method of claim 1, wherein the build material and the material for the solid mold are distinct materials.

* * * * *